(12) United States Patent  (10) Patent No.: US 8,285,474 B2
Doi  (45) Date of Patent: Oct. 9, 2012

(54) VEHICLE

(75) Inventor: Katsunori Doi, Tokyo (JP)

(73) Assignee: Kabushikikaisha Equos Research (JP)

( * ) Notice: Subject to any disclaimer, the term of this patent is extended or adjusted under 35 U.S.C. 154(b) by 779 days.

(21) Appl. No.: 12/227,576

(22) PCT Filed: Jun. 28, 2007

(86) PCT No.: PCT/JP2007/063030
§ 371 (c)(1),
(2), (4) Date: Apr. 15, 2009

(87) PCT Pub. No.: WO2008/001863
PCT Pub. Date: Jan. 3, 2008

(65) Prior Publication Data
US 2010/0017106 A1  Jan. 21, 2010

(30) Foreign Application Priority Data
Jun. 29, 2006 (JP) .................................. 2006-180089

(51) Int. Cl.
G06F 17/10 (2006.01)
(52) U.S. Cl. ........ 701/124; 180/6.5; 180/218; 180/65.1; 180/206.2; 340/467; 340/432
(58) Field of Classification Search ............... 701/81, 701/37, 124; 180/6.5, 218, 65.1, 206.2; 340/467, 340/432
See application file for complete search history.

(56) References Cited

U.S. PATENT DOCUMENTS
2004/0176890 A1* 9/2004 Acker et al. .................... 701/38
2006/0231313 A1* 10/2006 Ishii ............................. 180/218

FOREIGN PATENT DOCUMENTS
| JP | 2959469 | 10/1999 |
| JP | 2001-163098 | 6/2001 |
| JP | 2004-276727 | 10/2004 |
| JP | 2005-006436 | 1/2005 |
| JP | 2006-001385 | 1/2006 |
| JP | 2006-103423 | 4/2006 |

* cited by examiner

Primary Examiner — Thomas Black
Assistant Examiner — Luke Huynh
(74) Attorney, Agent, or Firm — Bacon and Thomas, PLLC

(57) ABSTRACT

Enabled is to lighten the load on a rider and to make the rider senses a turning state at the turning time of a transverse two-wheeled vehicle. A transverse acceleration (a) at a turn controlling time is detected to make a next inclination control in accordance with the magnitude of the acceleration. (a) In the case of an acceleration (a)≦a predetermined threshold ($a_0$), the vehicle is left uninclined to prevent the vehicle body from being unnecessarily inclined and rocked against a small centrifugal force, thereby to improve the riding comfortableness. (b) In the case of the acceleration (a)>the threshold ($a_0$), a riding portion is inclined such that the inclination angle $\theta_1$ may become the larger as the acceleration (a) becomes the higher. This can reduce the load on the rider against the centrifugal force. (c) As the acceleration (a) becomes the higher, the riding portion is so inclined the more as to increase the difference between the balanced inclination angle of the vehicle body and the inclination angle of the riding portion, so that the rider can bodily sense the increase/decrease of the centrifugal force.

3 Claims, 5 Drawing Sheets

F I G. 6A  EXAMPLE: MECHANISM OF INCLINING TIRES SIMULTANEOUSLY WITH VEHICLE BODY
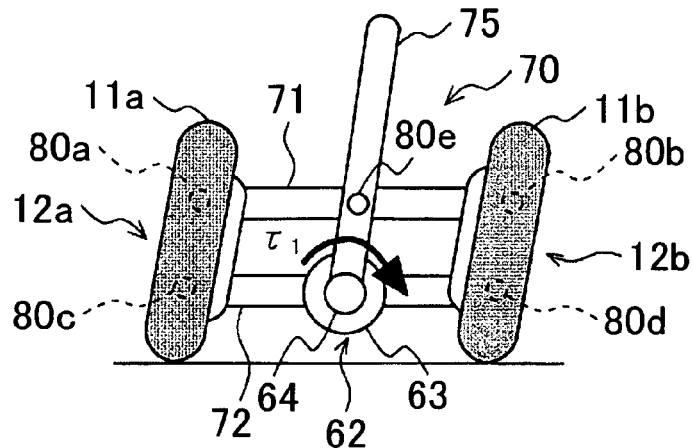
F I G. 6B  SLIDER INCLINATION MECHANISM
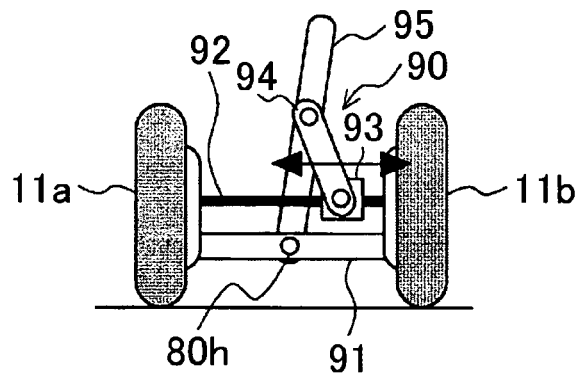
F I G. 6C  INCLINE ONLY RIDING PORTION
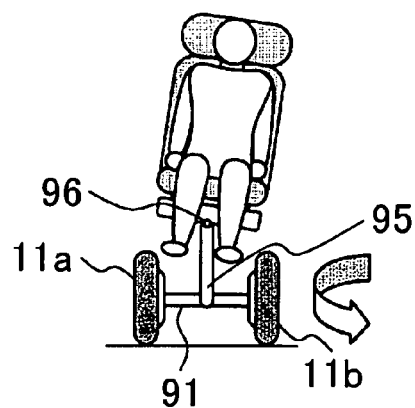

VEHICLE

TECHNICAL FIELD

The present invention relates to a vehicle, and relates to an attitude control at the time of turning of a transverse two-wheeled vehicle having two drive wheels arranged to oppose each other, for example.

BACKGROUND ART

Vehicles utilizing an attitude control of an inverted pendulum (hereinafter simply referred to as "inverted pendulum vehicle") have been attracting attention, and are currently on the way to being put to practical use.

For example, Patent Document 1 discloses technology relating to a transverse two-wheeled vehicle which has two drive wheels coaxially arranged to oppose each other and which is driven by detecting an attitude change of a vehicle body due to movement of the center of gravity of a driver.

Patent Document 1: Japanese Patent Application Publication No. JP-A-2004-276727

Such a vehicle maintains the stopped state or runs while performing the attitude control based on the weight shift amount of the driver, the operation amount from a remote control or an operating device, drive instruction data input in advance, or the like.

DISCLOSURE OF THE INVENTION

[Problems to be Solved by the Invention]

Compared to a general passenger car, such a one-man vehicle is small in size and narrow in interval between the left and right wheels. The proportion of the weight of a rider is large with respect to the weight of the entire vehicle, and the position of the center of gravity of the entire vehicle rises when the rider ensures a seated attitude.

Thus, if a turning speed is too high or the turning radius is too small when the vehicle makes a turn, the vehicle may be inclined excessively due to centrifugal force. Since the vertical load on the inner wheel side decreases, it may cause a slip of the inner wheel if not an overturn.

The centrifugal force is applied to the rider in the same manner, causing the rider a physical load and mental anxiety for the overturn.

As a solution, there is a method of moving the position of the center of gravity inward by inclining the vehicle body including the rider in the transverse direction (direction parallel to the wheel).

When the vehicle body is inclined up to an equilibrium inclination angle, a center point of vertical load moves to the center between the two wheels so that an overturn does not occur. The equilibrium inclination angle refers to an angle between a resultant force of gravity and centrifugal force and a vertical axis, and the center point of vertical load refers to an intersection point of a line parallel to the resultant force and passing through the center of gravity and the ground.

Since a force parallel to a seat is not applied to the rider, the physical load and the mental anxiety of the rider are small. However, the rider not being able to sense the quantitative state of the turn (the high turning speed or small turning radius) may cause a false recognition of the driving state to possibly result in an excessive turn or contradictory visual information.

Since the field of view of the rider is also inclined along with the inclination of a riding portion, a visual load increases regarding forward vision to decrease the riding comfortableness.

The problem with this inclination applies not only to the inclination in the transverse direction, but also to inclinations in other directions such as the front-rear direction in the same manner.

[Means for Solving the Problem]

Thus, a first object of the present invention is to provide a transverse two-wheeled vehicle which reduces the load of a rider and enables the rider to sense a turning state when making a turn of the vehicle.

A second object of the present invention is to provide a transverse two-wheeled vehicle which reduces the load of a rider and enables the rider to sense an acceleration/deceleration state when driving the vehicle.

(1) According to a first aspect of the present invention, the first object is achieved by a vehicle including two drive wheels arranged to oppose each other, a riding portion on which a weight body is placed, a transverse acceleration acquisition unit which acquires a transverse acceleration as an acceleration component in a horizontal direction with respect to an axle, a sensible acceleration determination unit which determines a sensible acceleration, which is an acceleration component in a horizontal direction with respect to the riding portion, based on the acquired transverse acceleration, and a riding portion inclination unit which inclines the riding portion based on the determined sensible acceleration.

(2) According to a second aspect of the present invention, the vehicle according the first aspect further includes a threshold value determination unit which determines whether the transverse acceleration has exceeded a predetermined threshold value, in which the riding portion inclination unit inclines the riding portion in a case where the threshold value determination unit determines that the predetermined threshold value has been exceeded.

(3) According to a third aspect of the present invention, in the vehicle according to the first or second aspect, the sensible acceleration determination unit increases the sensible acceleration along with an increase in the transverse acceleration.

(4) According to a fourth aspect of the present invention, the vehicle according to any one of the first to third aspects further includes a type determination unit which determines a type of the weight body, in which the riding portion inclination unit inclines the riding portion in a case where the type determination unit determines that the weight body is a human.

(5) According to a fifth aspect of the present invention, the second object is achieved by a vehicle including two drive wheels arranged to oppose each other, a riding portion on which a weight body is placed, an acceleration acquisition unit which acquires an acceleration with respect to an axle, a sensible acceleration determination unit which determines a sensible acceleration to be applied to the riding portion based on the acquired acceleration, and a riding portion inclination unit which inclines the riding portion based on the determined sensible acceleration.

[Effect of the Invention]

According to the first aspect of the present invention, since the riding portion is inclined in accordance with the magnitude of the centrifugal force applied to the vehicle in a range of, for example, less than the equilibrium inclination angle of the vehicle, the load of the rider can be reduced when making a turn of the vehicle and the rider can sense the turning state.

According to the second aspect of the present invention, since whether the threshold value of the translational acceleration has been exceeded is determined and the riding portion is inclined in the case where the threshold value is determined to be exceeded, the riding portion is not inclined by a small centrifugal force, whereby the riding portion is not inclined frequently. Thus, energy saving of the system can be achieved, and small movements in the field of view are eliminated for the rider to improve the riding comfortableness.

According to the third aspect of the present invention, since the sensible acceleration is increased along with the increase of the transverse acceleration, the rider can sense the sensible acceleration to a greater degree as the acceleration increases. The increase of the centrifugal force can thus be sensed.

According to the fourth aspect of the present invention, since the type of the weight body is determined and the riding portion is inclined in the case where the weight body is determined to be a human, energy consumption can be reduced in the case where it is not necessary to cause a feeling of the sensible acceleration.

According to the fifth aspect of the present invention, since the riding portion is inclined in accordance with the acceleration with respect to the axle, the load of the rider can be reduced and the rider can sense the acceleration state when driving the vehicle.

BRIEF DESCRIPTION OF THE DRAWINGS

FIG. 6 shows illustrative views showing configuration examples of a vehicle body inclination mechanism which inclines the vehicle body to a target inclination angle $\theta_1^*$.
11 drive wheel
12 drive motor
13 riding portion
131 seat portion
14 supporting member
16 control unit
20 control ECU
21 vehicle body driving control system
22 transverse acceleration determination system
23 vehicle body inclination control system
30 operating device
31 controller
40 driving/attitude control sensor
41 wheel tachometer
42 accelerometer
43 vehicle body inclinometer
60 actuator
61 wheel drive actuator
62 vehicle body inclination actuator

BEST MODES FOR CARRYING OUT THE INVENTION

Hereinafter, a preferred embodiment of a vehicle of the present invention will be described in detail with reference to FIGS. 1 to 6.
(1) Outline of Present Embodiment
In this embodiment, both the reduction of load of a rider due to centrifugal force and turning feeling are realized by detecting a transverse acceleration a corresponding to the centrifugal force and causing a riding portion to be inclined in the following manner in accordance with the magnitude of the transverse acceleration when making the turn.

(a) In the case where the detected acceleration a is less than or equal to a predetermined threshold value $a_0$, the vehicle is not inclined. That is, the inclination angle $\theta_1 = 0$ with respect to the vertical line of the riding portion.

By providing the threshold value $a_0$ in this manner, the vehicle can be prevented from being inclined constantly in correspondence with small centrifugal force, thereby improving the riding comfortableness.

(b) In the case where the detected acceleration a is greater than the predetermined threshold value $a_0$, the riding portion is inclined to a greater inclination angle $\theta_1$ as the acceleration a increases, within a range where $\theta_1$ is greater than zero in the upright state and smaller than an equilibrium inclination angle $\phi_{eq}$.

With the inclination angle $\theta_1$ having a greater value than zero, the load on the rider attributed to the inclination can be reduced. With a value smaller than the equilibrium inclination angle $\phi_{eq}$, the rider can sense the turn while driving the vehicle.

(c) The riding portion is inclined such that the difference between the equilibrium inclination angle $\phi_{eq}$ of the vehicle and the inclination angle of the riding portion increases as the detected acceleration a increases.

Accordingly, the sensible acceleration for the rider increases as the acceleration a increases, thereby enabling the rider to sense the increase of the centrifugal force.
(2) Details of Present Embodiment
FIG. 1 shows an example of the outline configuration of the vehicle according to this embodiment.

Figure 1:
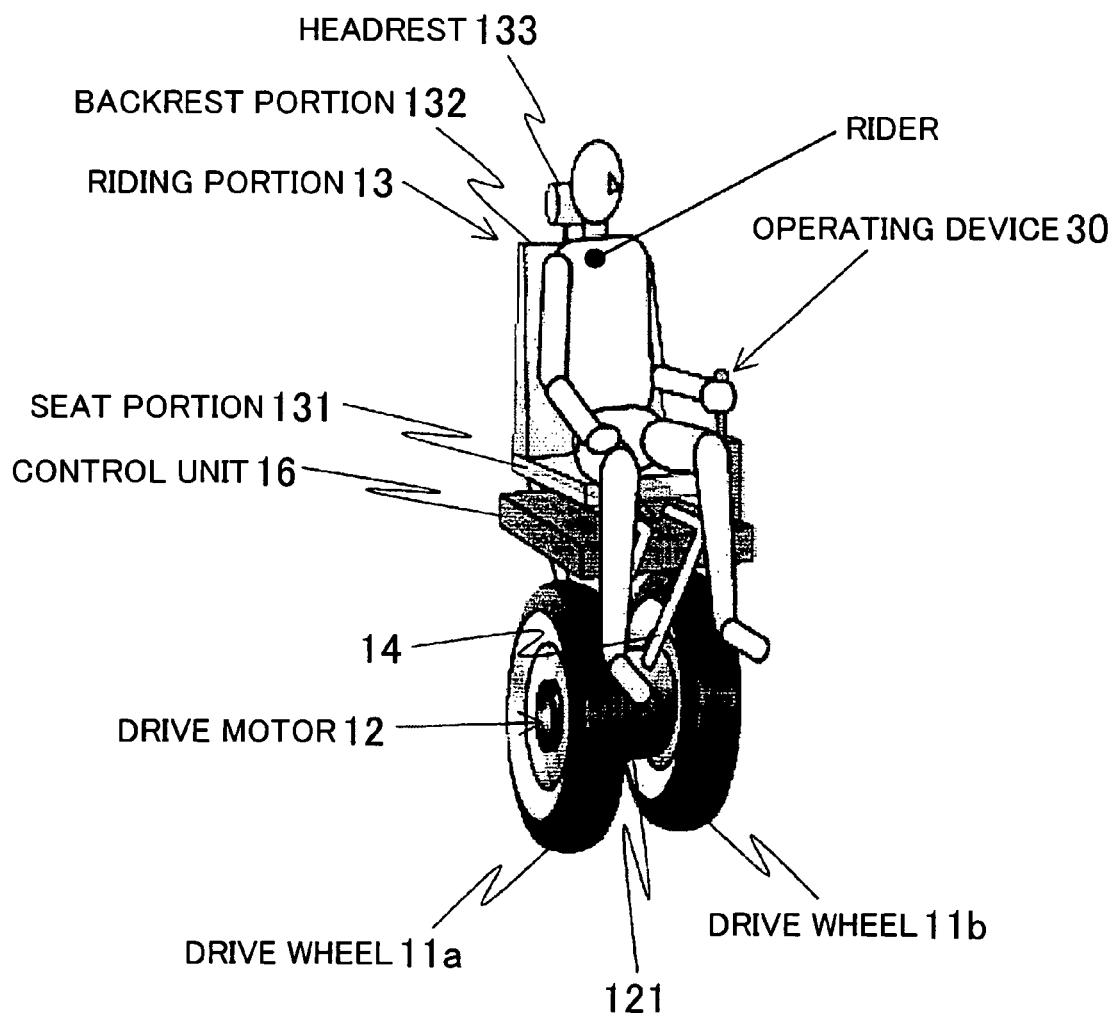
FIG. 1 is an overall configuration diagram of a vehicle according to an embodiment of the present invention.

As shown in FIG. 1, the vehicle includes two drive wheels 11a and 11b arranged coaxially.

The two drive wheels 11a and 11b are each driven by a drive motor 12.

Above the drive wheels 11a and 11b (hereinafter collectively called "drive wheel 11" in the case of referring to both drive wheels 11a and 11b) and the drive motor 12, a riding portion 13 (seat) on which baggage, a rider, or the like as a weight body is placed is provided.

The riding portion 13 includes a seat portion 131 where the driver is to be seated, a backrest portion 132, and a headrest 133.

The riding portion 13 is supported by a supporting member 14 fixed to a drive motor case 121 storing the drive motor 12.

An operating device 30 is arranged on the left side of the riding portion 13. The operating device 30 is for instructing acceleration, deceleration, turn, rotation, stop, braking, and the like of the vehicle by an operation of the driver.

The operating device 30 in this embodiment is fixed to the seat portion 131, but may be configured by a remote control with wired or wireless connection. The operating device 30 may be arranged on an upper portion of an armrest.

The vehicle in this embodiment is arranged with the operating device 30. However, in the case of a vehicle which is automatically driven in accordance with drive instruction data determined in advance, a drive instruction data acquisition portion is arranged instead of the operating device 30. The drive instruction data acquisition portion may be configured of, for example, a read unit which reads the drive instruction data from various storage media such as a semiconductor memory and/or a communication control unit which acquires the drive instruction data externally by wireless communication.

Note that, although FIG. 1 shows a case where a human is on the riding portion 13, the vehicle is not necessarily limited to that driven by a human, and may be driven or stopped by an external remote control operation or the like with only baggage thereon, driven or stopped in accordance with the drive instruction data with only baggage thereon, or driven or stopped in a state where with nothing thereon.

Note that, in the case where a human is not on the riding portion 13, in other words, only baggage or nothing is thereon, a turn attitude control of this embodiment is not performed, and one of an upright turn in which the turn is made while maintaining an upright attitude and an equilibrium inclination turn in which the turn is made with the vehicle body inclined up to the equilibrium inclination angle may be employed.

For example, the upright turn is employed in the case where baggage is placed on the riding portion 13, in order to prevent inclination of the baggage or movement due to the inclination, and the equilibrium inclination turn is employed in the case where nothing is placed thereon, in order to ensure security to prevent falling at the time of turning.

In this embodiment, control of acceleration/deceleration and the like is performed by an operation signal output by the operation of the operating device 30. However, for example, the driver may change a forward inclination moment or the longitudinal inclination angle with respect to the vehicle to perform the attitude control and the driving control of the vehicle in accordance with the inclination angle, as shown in Patent Document 1. Alternatively, the two may be switchable.

A control unit 16 is arranged between the riding portion 13 and the drive wheel 11.

The control unit 16 in this embodiment is attached to the under surface of the seat portion 131 of the riding portion 13, but may be attached to the supporting member 14.

Figure 2:
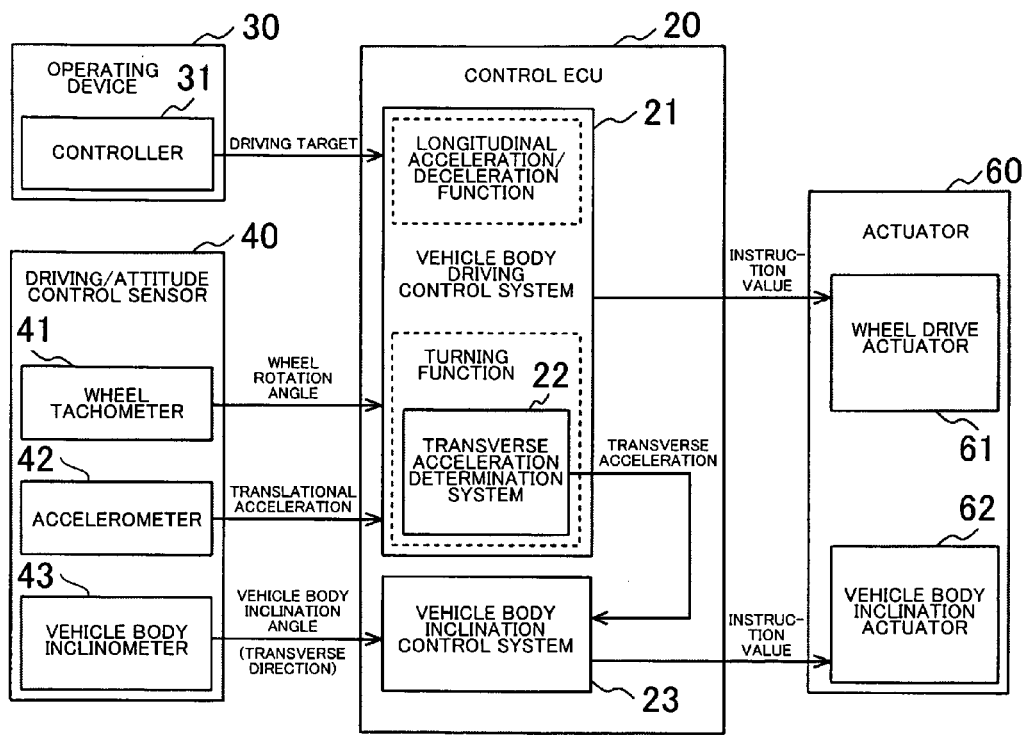
FIG. 2 is a configuration diagram of a control unit.

FIG. 2 shows the configuration of the control unit 16.

The control unit 16 includes a control ECU (electronic control unit) 20 which performs various controls such as the driving and attitude control of the vehicle, and vehicle body inclination control according to this embodiment. The control ECU 20 is electrically connected with other devices such as the operating device 30, a driving/attitude control sensor 40, an actuator 60, and a battery.

The battery supplies electric power to a wheel drive actuator 61, a vehicle body inclination actuator 62, the control ECU 20, or the like.

The control ECU 20 is configured of a computer system including a ROM storing data and various programs such as a driving control program, an attitude control program, and a turn control program, a RAM used as a working area, an external storage device, an interface portion, and the like.

The control ECU 20 includes a vehicle body driving control system 21 and a vehicle body inclination control system 23.

The vehicle body driving control system 21 is configured to provide a longitudinal acceleration/deceleration function of controlling the acceleration/deceleration of the vehicle in the front-rear direction, and a turning function of turning the vehicle, and includes a transverse acceleration determination system 22 in order to provide the turning function.

The vehicle body driving control system 21 performs the attitude control, and supplies an instruction value supplied from the operating device 30 and corresponding to the instruction regarding the front-rear direction and the turn to the wheel drive actuator 61.

The transverse acceleration determination system 22 calculates the transverse acceleration a from wheel rotation angles of the two drive wheels 11a and 11b supplied from the driving/attitude control sensor 40 and/or translational acceleration, and supplies the calculated results to the vehicle body inclination control system 23.

The vehicle body inclination control system 23 determines the target inclination angle $\theta_1^*$ as a vehicle body (riding portion 13) inclination angle in accordance with the magnitude of the supplied transverse acceleration a, and supplies the corresponding instruction value to the vehicle body inclination actuator 62.

The operating device 30 includes a controller 31, and a target value in the vehicle driving is supplied to the control ECU 20 based on the operation of the driver.

The driving/attitude control sensor 40 includes a wheel tachometer 41 which detects the wheel rotation angle, an accelerometer 42 which detects the translational acceleration of the vehicle, and a vehicle body inclinometer 43 which detects the vehicle body inclination angle (roll angle) in the transverse direction.

The detected value by the driving/attitude control sensor 40 is supplied to the vehicle body driving control system 21 and the transverse acceleration determination system 22.

The actuator 60 includes the wheel drive actuator 61 which drives the drive wheel 11 in accordance with the instruction value supplied from the vehicle body driving control system 21, and the vehicle body inclination actuator 62 which inclines the riding portion 13 in the transverse direction by the inclination angle $\theta_1$ with respect to the vertical line in accordance with the instruction value supplied from the vehicle body inclination control system 23.

A turn control process of the vehicle as one embodiment configured as described above will be described next.

Figure 3:
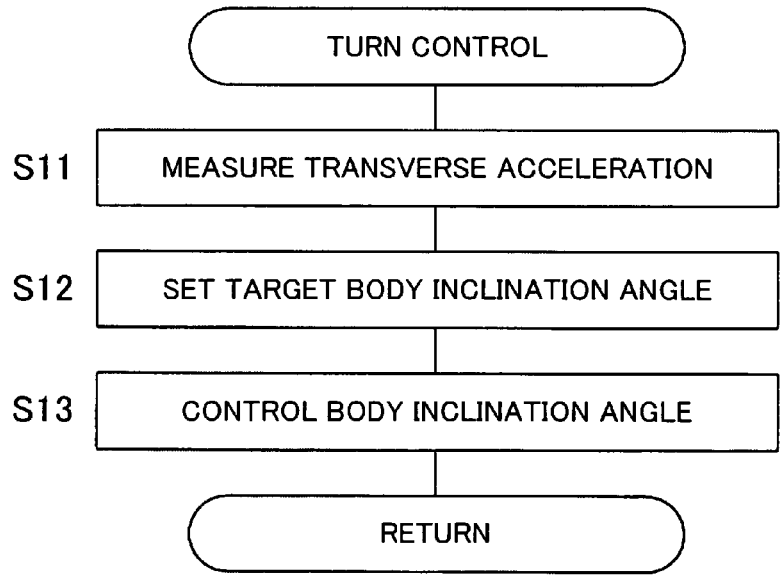
FIG. 3 is a flowchart showing the content of a turn control process.

FIG. 3 is a flowchart showing the content of the turn control process.

As shown in the flowchart, the control ECU 20 measures the transverse acceleration a applied to the vehicle using the transverse acceleration determination system 22 (step 11).

The vehicle body inclination control system 23 sets the target vehicle body inclination angle using the measured transverse acceleration a (step 12), controls the vehicle body inclination angle (inclination angle of the riding portion 13) (step 13), and returns to a main routine.

Hereinafter, the operation in each step will be described in detail.

First, the transverse acceleration determination system 22 of the control ECU 20 acquires the wheel rotation angle of each of the drive wheels 11a and 11b from the wheel tachometer 41 of the driving/attitude control sensor 40, acquires the translational acceleration from the accelerometer 42, and determines the transverse acceleration a of the vehicle body from these pieces of data (step 11).

FIG. 4 shows mechanical states of the vehicle while turning with the vehicle body being inclined.

For the measurement of the transverse acceleration a, there are (1) a method of using a measured value of the wheel tachometer 41 (angle meter) for each wheel (drive wheels 11a and 11b), and (2) a method of using a measured value of the accelerometer 42.

(1) Method of Using Measured Value of Wheel Tachometer 41

In this method, the state of the turn is estimated, i.e., a transverse acceleration $a^{(1)}$ in a center-of-gravity position P of the rider is calculated, from the rotational speeds of the left and right drive wheels 11a and 11b.

Figure 4A:
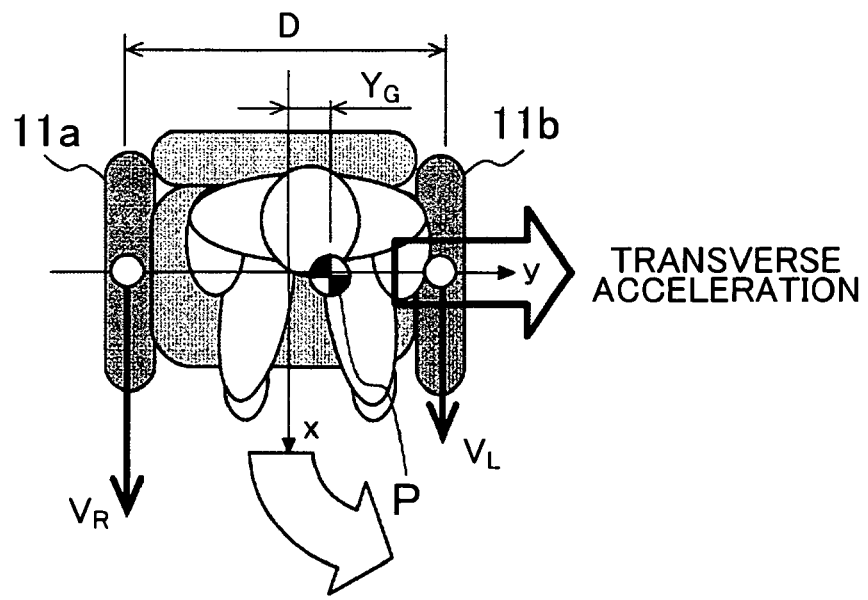
FIG. 4 shows illustrative views showing mechanical states of the vehicle when making a turn with a vehicle body being inclined.

As shown in FIG. 4A, when the circumferential speed of the drive wheel 11a on the right side when seen from the rider is $V_R$ and the circumferential speed of the drive wheel 11b on the left side is $V_L$, the transverse acceleration $a^{(1)}$ is calculated from the following Formula 1 and Formula 2.

$$a^{(1)} = V \cdot \Delta V/D \quad \text{Formula 1}$$

$$V = V_M - (Y_G/D)\Delta V$$

$$V_M = (1/2)(V_R + V_L)$$

$$\Delta V = V_R - V_L$$

$$V_R = R_W \omega_{WR}$$

$$V_L = R_W \omega_{WL}$$

$$Y_G = l \sin \theta_1 \quad \text{Formula 2}$$

Note that the symbols in Formula 2 are as follows.
$\omega_{WR}$: Right wheel angular speed
$\omega_{WL}$: Left wheel angular speed
$R_W$: Tire contact radius
D: Tread
l: Distance from the axle to the center of gravity (the center of gravity of a rider with the vehicle body in an upright state)
$\theta_1$: Vehicle body inclination angle (2) Method of Using Measured Value of Accelerometer 42

In this method, the state of the turn is estimated, i.e., a transverse acceleration $a\sim^{(2)}$ in a sensor attachment position (reference position) is calculated, from the value of the translational acceleration measured by the accelerometer 42.

Figure 4B:
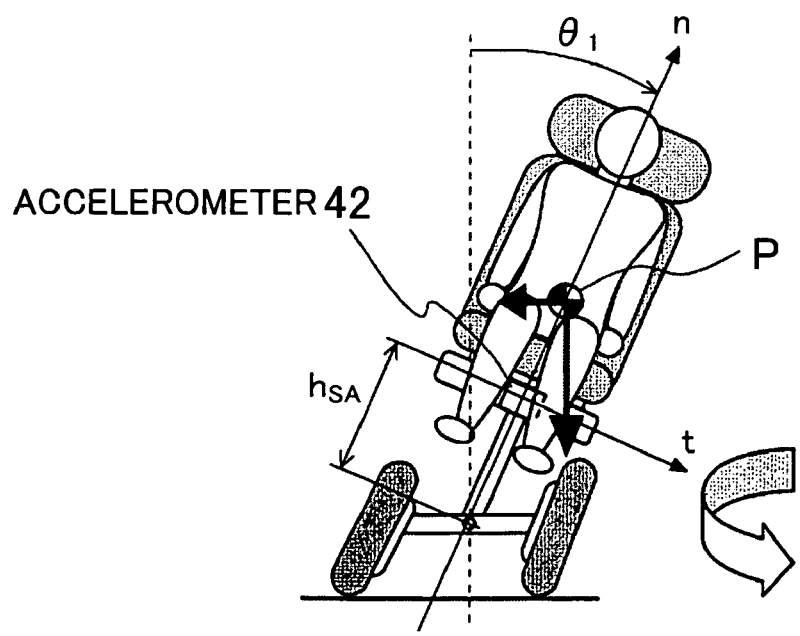

As shown in FIG. 4B, in the case where the vehicle body center axis is an n-axis, an axis orthogonal to a vehicle body symmetry plane is a t-axis, the sensor acceleration (each axial component) is $a_n$ and $a_t$, and the vehicle body inclination angle is $\theta_1$, the transverse acceleration $a\sim^{(2)}$ is calculated from the following Formula 3.

$$a\sim^{(2)} = a_t \cos \theta_1 + a_n \sin \theta_1 \quad \text{Formula 3}$$

In this embodiment, the method of using the measured value of the wheel tachometer 41 and the method of using the measured value of the accelerometer 42 are both used to calculate the transverse acceleration a.

The vehicle body driving control system 21 determines whether the drive wheel is slipping, and uses the transverse acceleration $a^{(1)}$ of the wheel tachometer 41 when the drive wheel is not slipping, and uses the transverse acceleration $a\sim^{(2)}$ of the accelerometer 42 when the drive wheel is slipping.

Next, a slip determination of the drive wheel will be described.

The vehicle body driving control system 21 calculates the transverse acceleration $a\sim^{(1)}$ in accordance with the following Formula 4 from the measured value of the wheel tachometer 41.

Note that $h_{SA}$ in Formula 4 below represents the distance from the center of rotation in the vehicle body inclination to the acceleration sensor.

$$a\sim^{(1)} = a^{(1)} + (\Delta V/D)^2 (Y_G - h_{SA} \sin \theta_1) \quad \text{Formula 4}$$

The vehicle body driving control system 21 obtains $\Delta a = a\sim^{(1)} - a\sim^{(2)}$, and determines that a slip is occurring in the case where an absolute value of $\Delta a$ is greater than or equal to a predetermined set value $\epsilon$.

The vehicle body driving control system 21 determines which one of the left and right drive wheels 11 is slipping from the following Formula 5.

$a\sim^{(1)} - a\sim^{(2)} \geq \epsilon$, when the drive wheel 11a on the right side is slipping.

$a\sim^{(1)} - a\sim^{(2)} \leq -\epsilon$, when the drive wheel 11b on the left side is slipping. \quad Formula 5

When the transverse acceleration a is determined as described above, the vehicle body inclination control system 23 sets a target value $\theta^*$ of the angle to which the vehicle body is to be inclined based on the target value of the acceleration sensed by the rider (step 12 in FIG. 3).

That is, the vehicle body inclination control system 23 first calculates the equilibrium inclination angle $\phi_{eq}$ according to Formula 5. In Formula 5, a is the acceleration in a substantial center-of-gravity position obtained in step 11, g is the gravitational acceleration, and $\theta_1$ is the vehicle body inclination angle.

Figure 5A:
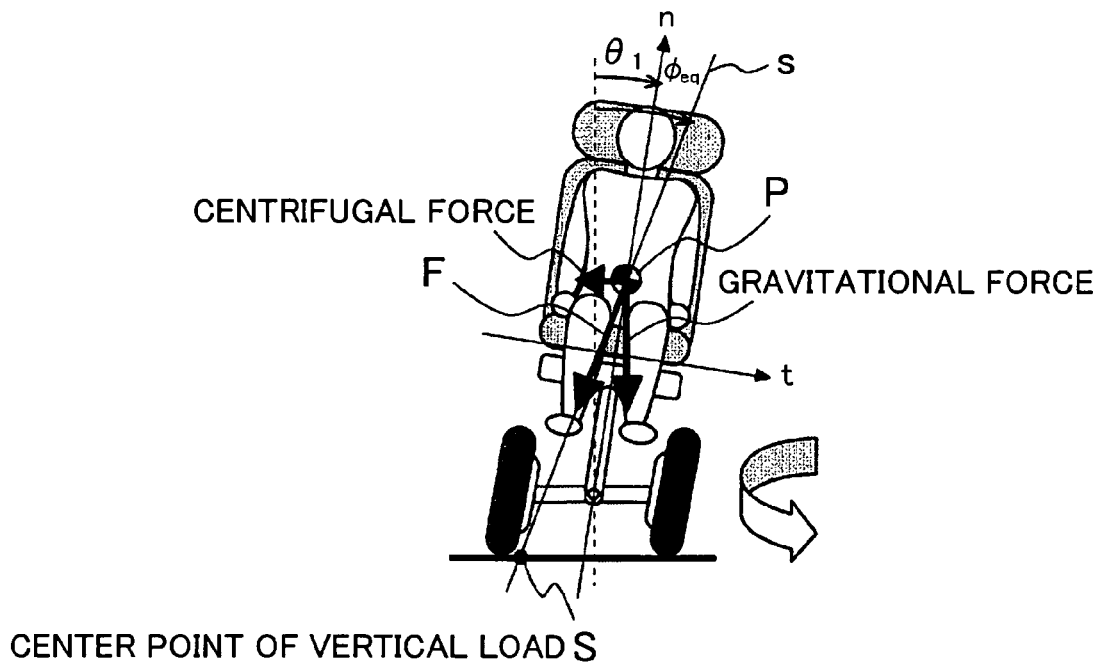
FIG. 5 shows illustrative views of the determination of a target vehicle body inclination angle.

As shown in FIG. 5A, the equilibrium inclination angle $\phi_{eq}$ represents an angle between the vertical axis and a resultant vector F of centrifugal force and gravity. Note that the intersection point of a line passing through the center of gravity and parallel to the resultant vector and the ground is represented as a center point S of vertical load.

When the vehicle body is inclined to the equilibrium inclination angle $\phi_{eq}$, the rider does not sense a transverse force.

$$\phi_{eq} = \tan^{-1}(a/g) \quad \text{Formula 5}$$

Note that a transverse acceleration $a_H$ sensed by the rider is shown by the following Formula 6.

$$a_H = (\sqrt{a^2 + g^2}) \sin(\phi_{eq} - \theta_1) \quad \text{Formula 6}$$

The vehicle body inclination control system 23 determines the angle (target inclination angle $\theta_1^*$) to which the vehicle body (riding portion 13) is actually inclined from the calculated equilibrium inclination angle $\phi_{eq}$ in accordance with a target body inclination angle determination function (unit) shown by the following Formula 7 set in advance.

$$\theta_1^* = \begin{cases} (1 - C_{SA})(\phi_{eq} + \phi_0) & (\phi_{eq} < -\phi_0) \\ 0 & (-\phi_0 \leq \phi_{eq} \leq \phi_0) \\ (1 - C_{SA})(\phi_{eq} - \phi_0) & (\phi_{eq} > \phi_0) \end{cases} \quad \text{Formula 7}$$

In Formula 7 shown above, $\phi_0$ and $C_{SA}$ are parameters for which values set in advanced are used. The $\phi_0$ is an upper limit value of a dead band, and corresponds to the strength of the centrifugal force by which the vehicle body inclination is started. The $C_{SA}$ is an acceleration change detection coefficient, and represents the ratio of the increase or decrease of the sensible acceleration with respect to the increase or decrease of the transverse acceleration.

While Formula 7 exemplifies a case used in this embodiment, other formulas may also be used. It is also acceptable that a conversion table from the equilibrium inclination angle $\phi_{eq}$ to the target inclination angle $\theta_1^*$ is stored, and the target inclination angle $\theta_1^*$ is determined in accordance with the conversion table.

Figure 5B:
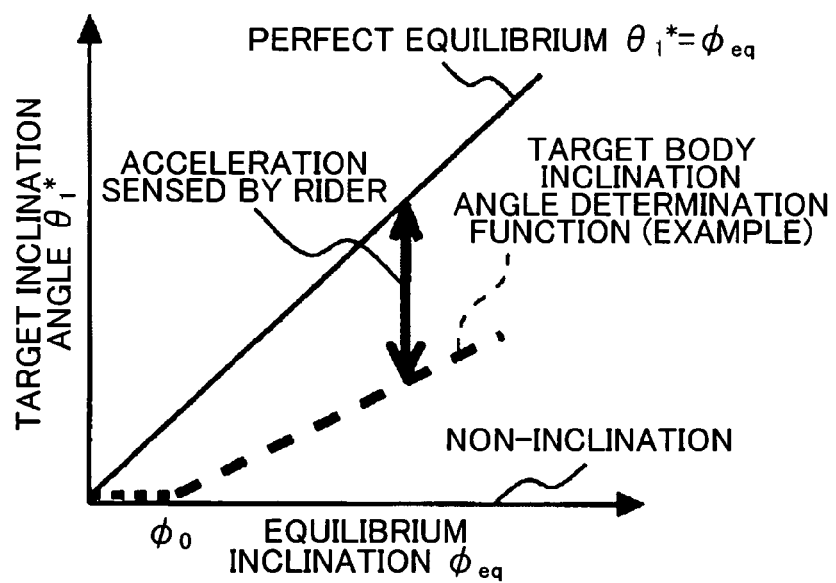

FIG. 5B shows a graph of the target body inclination angle determination function (Formula 7).

As shown in FIG. 5B, in the turn process of this embodiment, the target inclination angle $\theta_1^*$ of the vehicle body is determined in accordance with the measure of the equilibrium inclination angle $\phi_{eq}$ (i.e., in accordance with the centrifugal force or the transverse acceleration a).

(a) In the case where the equilibrium inclination angle $\phi_{eq}$ is small, i.e., the centrifugal force is small ($|\phi_{eq}| < |\phi_0|$), the vehicle body is not inclined (target inclination angle $\theta_1^* = 0$).

Accordingly, a small rocking behavior of the attitude or the field of view of the rider can be prevented.

Also, energy necessary for the inclination of the riding portion 13 can be saved. Particularly, it is effective for a case where the riding portion 13 is inclined using a slide screw mechanism.

(b) In the case where the equilibrium inclination angle $\phi_{eq}$ is large, i.e., the centrifugal force is large ($|\phi_{eq}|>|\phi_0|$), the vehicle body is inclined to some degree.

That is, by inclining the vehicle body, the load on the body of the rider due to the centrifugal force and mental anxiety of the rider for an overturn of the vehicle body or falling of the rider can be reduced.

By not inclining the vehicle body (riding portion 13) to the equilibrium inclination angle $\phi_{eq}$ and increasing the difference as the centrifugal force (equilibrium inclination angle $\phi_{eq}$) increases, i.e., making an inclination smaller than the inclination of the line segment $\theta_1^*=\phi_{eq}$ (perfect equilibrium) in FIG. 5B, the rider can sense the turning state of the vehicle and the transverse acceleration (and consequently the risk of the vehicle body overturning).

When the target inclination angle $\theta_1^*$ is determined, the vehicle body inclination control system 23 then supplies the instruction value to the vehicle body inclination actuator 62 such that the actual vehicle body inclination angle $\theta_1$ coincides with the target inclination angle $\theta_1^*$ (step 13 in FIG. 3).

That is, the vehicle body inclination control system 23 changes the inclination of the rider by inclining a part of the vehicle body including the riding portion 13.

FIG. 6 shows configuration examples of a vehicle body inclination mechanism for inclining the vehicle body to the target inclination angle $\theta_1^*$.

The vehicle body inclination mechanism shown in FIG. 6A functions as a riding portion inclination unit, and includes a link mechanism 70 provided to the drive wheels 11a and 11b.

The link mechanism 70 includes an upper portion link 71 and a lower portion link 72, and both ends of the two links 71 and 72 are respectively supported by support shafts 80a to 80d of the drive wheels 11a and 11b.

Note that supporting members for supporting the support shafts 80a to 80d are attached to drive motors 12a and 12b by welding or the like.

In this manner, the link mechanism 70 is configured as a four link mechanism in a parallelogram, with the upper portion link 71 and the lower portion link 72 respectively being the upper side and the lower side and the drive motor 12a and the drive motor 12b being two lateral sides.

A support shaft 80e is provided in the center of the upper portion link 71, and a stator 63 of the inclination motor (vehicle body inclination actuator) 62 is arranged in the center of the lower portion link 72.

On the lower side end portion of a connection link 75 arranged in the upper portion of the riding portion 13, a rotor 64 of the inclination motor 62 is fixed, and the support shaft 80e of the upper portion link 71 is fixed to the body of the connection link 75.

In the link mechanism 70 configured in this manner, driving the inclination motor 62 causes deformation of the parallelogram of the link mechanism 70 such that the riding portion 13 is inclined along with the inclination of the connection link 75.

With the actuator (inclination motor 62) which provides a torque $\tau_1$ and a sensor which measures the inclination angle, the vehicle body is inclined to an arbitrary angle with one point on the center axis of the vehicle body as a pivot point.

At this time, a displacement of the center point of vertical load at the equilibrium inclination angle can be eliminated by causing the pivot point to coincide with the axle and inclining a tire in accordance with the inclination of the vehicle body.

The vehicle body inclination mechanism shown in FIG. 6B is a mechanism which inclines the riding portion 13 using a slider mechanism 90. The slider mechanism 90 is a mechanism by which the drive wheels 11a and 11b are not inclined regardless of the inclination of the riding portion 13.

A fixed shaft 91 and a slider shaft 92 are fixed to the two drive wheels 11a and 11b. The lower side end portion of a riding portion support shaft 95 of which the upper end portion is provided with the riding portion 13 is supported by a support shaft 80h in the center of the fixed shaft 91.

A slider 93 which is capable of a reciprocating motion in the horizontal direction along the slider shaft 92 is arranged in the slider shaft 92. The slider 93 and the riding portion support shaft 95 are connected by a connection shaft 94.

By the movement of the slider 93, the riding portion support shaft 95 and the riding portion 13 are inclined with the support shaft 80h as a fulcrum.

The vehicle body inclination mechanism shown in FIG. 6C is configured such that the two drive wheels 11a and 11b, the fixed shaft 91 fixed to the two drive wheels 11a and 11b, and the riding portion support shaft 95 fixed to the lower side end portion of the fixed shaft 91 are not inclined, but the riding portion 13 arranged in the upper end portion of the riding portion support shaft 95 is inclined by driving an inclination motor 96.

Note that the vehicle body inclination mechanism may use other various mechanisms and driving forces to incline the riding portion 13 using a cam mechanism, a ball screw, a hydraulic cylinder, or the like, for example.

In the vehicle body inclination mechanism configured as described above, the torque $\tau_1$ is determined from the output of the vehicle body inclination actuator (inclination motor) 62 by a state feedback control shown by the following Formula 8 using the measured vehicle body inclination angle $\theta_1$ and the determined target inclination angle $\theta_1^*$.

$$\tau_1 = \tau_1^* - K_1(\theta_1 - \theta_1^*) - K_2(\dot{\theta}_1 - \dot{\theta}_1^*)$$

$$\tau_1^* = m_0 l_0 (g \sin \theta_1^* + a \cos \theta_1^*) \qquad \text{Formula 8}$$

In the state feedback control of Formula 8, $K_1$ and $K_2$ show a feedback gain, $m_0$ shows the mass of an inclination movable portion, and $l_0$ shows the distance from the axle to the center of gravity P of the inclination movable portion.

The feedback gains $K_1$ and $K_2$ are determined by a pole placement method, for example. At this time, the convergence speed is set low in order to reduce the inertia force at the time of an attitude shift.

In the embodiment described above, the attitude control in the transverse direction at the time of the turn of a single-axis two-wheeled vehicle has been described as an example. However, in the present invention, it is also possible to apply a method of a sensible acceleration adjustment of this embodiment to the attitude control in the transverse direction of a vehicle having three or more wheels.

In the embodiment described above, a case of uniformly determining the sensible acceleration (target inclination angle $\theta_1^*$) of the rider in accordance with the target body inclination angle determination function (Formula 7) shown in FIG. 5B has been described. However, the perception of the acceleration may be changed in the following manner in accordance with the preference of the rider or the type of a loaded object.

(a) The degree of inclination of the vehicle is changed in accordance with the preference of the rider.

(b) If the loaded object is "baggage," inclination is caused up to the equilibrium inclination angle $\phi_{eq}$ to prevent rolling or falling of the baggage.

(c) If "none" of the objects is loaded, no inclination is caused to prevent a waste of energy.

Whether the loaded object is a human (rider) or baggage or there is no (none) loaded object can be determined in the following manner.

That is, a load meter and a seating height meter are provided in the riding portion 13 so that a mass $m_H$ and a seating height $\zeta_H$ of the loaded object are measured and supplied to the vehicle body inclination control system 23.

The vehicle body inclination control system 23 determines what the loaded object is from values of the mass $m_H$ and the seating height $\zeta_H$ obtained by the measurement using the following threshold values, for example.

(a) It is determined that "none" of the objects is loaded in the case where $m_H$<0.2 kg and $\zeta_H$<0.01 m.
(b) It is determined that the loaded object is a "human" in the case where $m_H$>8 kg, $\zeta_H$>0.3 m, and $m_H/\zeta_H$>30 kg/m.
(c) It is determined that the loaded object is a "baggage" in other cases (cases other than (a) and (b)).

In the determination conditions described above, the reason that the body weight is 8 kg in the determination condition (b) for a human is because it also assumes a case where a child is on the vehicle. By adding the weight per unit seating height ($m_H/\zeta_H$) to the determination condition for a human, the determination for a human can be performed more accurately. In this case, in order not to determine a small heavy baggage (for example, mass of iron) as a human, an upper limit of $m_H/\zeta_H$<p (for example, 80 kg/m) may be added as a determination condition (AND condition).

Note that the determination conditions and determination values are examples, and may be appropriately changed and determined in accordance with the assumed usage conditions.

In the embodiment described above, a case where the vehicle body is inclined in accordance with the target body inclination angle determination function (Formula 7) exemplified in FIG. 5B has been described. However, switching and adjustment of a vehicle body inclination mode may be enabled by an input operation by a switch or the like.

For example, an "Active" mode, a "Normal" mode, or an "Easy" mode is selected by the switch to discretely change the parameter in the target body inclination angle determination function in accordance with each mode selection.

A continuous parameter change may be enabled by dialing or inputting a number.

In the embodiment and a modified example described above, a case has been described where the transverse acceleration a corresponding to the centrifugal force is detected at the time of turning and the riding portion is inclined to increase the difference between the equilibrium inclination angle $\phi_{eq}$ of the vehicle and the inclination angle of the riding portion as the detected acceleration a increases so that the increase in the centrifugal force is sensed as the transverse acceleration a increases. However, embodiments are not limited to that for sensing the transverse acceleration and the centrifugal force.

That is, it may be configured such that the acceleration applied to the riding portion is acquired, the sensible acceleration is determined to increase as the acquired acceleration increases, and the riding portion is inclined based on the determined sensible acceleration.

For example, in the case of the longitudinal acceleration, the sensible acceleration is the acceleration/deceleration to be sensed. For example, in the case of both of the longitudinal acceleration and the transverse acceleration (of the embodiment described above), the sensible acceleration is the longitudinal acceleration/deceleration and the centrifugal force.

The invention claimed is:

1. A vehicle comprising:
two drive wheels arranged opposing each other;
a riding portion for supporting a body weight;
a transverse acceleration acquisition unit which acquires a transverse acceleration as an acceleration component in a horizontal direction with respect to an axle;
a threshold value determination unit which determines whether the transverse acceleration has exceeded a predetermined threshold value;
a sensible acceleration determination unit which determines a sensible acceleration, which is an acceleration component in a horizontal direction with respect to the riding portion, based on the acquired transverse acceleration, and which increases the sensible acceleration along with an increase in the transverse acceleration; and
a riding portion inclination unit which inclines the riding portion based on the determined sensible acceleration, responsive to a determination by the threshold value determination unit that the predetermined threshold value has been exceeded.

2. The vehicle according to claim 1, further comprising:
a type determination unit which determines a type of the body weight, wherein
the riding portion inclination unit inclines the riding portion in a case where the type determination unit determines that the type of body weight is a human.

3. A vehicle comprising:
two drive wheels arranged opposing each other;
a riding portion for supporting a body weight;
an acceleration acquisition unit which acquires an acceleration with respect to an axle;
a threshold value determination unit which determines whether the acquired acceleration has exceeded a predetermined threshold value;
a sensible acceleration determination unit which determines a sensible acceleration to be applied to the riding portion based on the acquired acceleration, and which increases the sensible acceleration along with an increase in the acquired acceleration; and
a riding portion inclination unit which inclines the riding portion based on the determined sensible acceleration, responsive to a determination by the threshold value determination unit that the predetermined threshold value has been exceeded.

* * * * *